(12) United States Patent
Wang

(10) Patent No.: US 11,967,344 B2
(45) Date of Patent: Apr. 23, 2024

(54) VIDEO PROCESSING METHOD AND APPARATUS, DEVICE AND COMPUTER READABLE STORAGE MEDIUM

(71) Applicant: Beijing Bytedance Network Technology Co., Ltd., Beijing (CN)

(72) Inventor: Yan Wang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/087,722

(22) Filed: Dec. 22, 2022

(65) Prior Publication Data

US 2023/0127373 A1    Apr. 27, 2023

Related U.S. Application Data

(63) Continuation of application No. PCT/CN2021/101896, filed on Jun. 23, 2021.

(30) Foreign Application Priority Data

Jun. 23, 2020    (CN) .......................... 202010582609.X

(51) Int. Cl.
*G11B 27/031*    (2006.01)
*H04N 5/262*    (2006.01)

(52) U.S. Cl.
CPC ........... *G11B 27/031* (2013.01); *H04N 5/262* (2013.01)

(58) Field of Classification Search
CPC .. G11B 27/031; H04N 5/262; H04N 21/2743; H04N 21/4223; H04N 21/431;
(Continued)

(56) References Cited

U.S. PATENT DOCUMENTS

2010/0005070 A1    1/2010    Moriya et al.
2010/0245610 A1    9/2010    Ahn et al.
(Continued)

FOREIGN PATENT DOCUMENTS

CN    109688463 A    4/2019
CN    109819179 A    5/2019
(Continued)

OTHER PUBLICATIONS

English Translation of Chinese Publication CN110139159 (Year: 2019).*

(Continued)

*Primary Examiner* — Loi H Tran
(74) *Attorney, Agent, or Firm* — Alleman Hall & Tuttle LLP

(57) ABSTRACT

The present disclosure provides a video processing method and apparatus, a device, a computer readable storage medium, a computer program product, and a computer program, the method includes: acquiring an image to be processed; determining, according to the image to be processed, a target image and a target editing pattern, wherein the target editing pattern comprises at least one of a special effect acting on an audio corresponding to the target image, a special effect acting on an editing point between adjacent images, a special effect acting on a single image, and a special effect acting on an entire editing image; and performing, according to the target editing pattern, an editing operation on the target image, to obtain a target video.

8 Claims, 5 Drawing Sheets

(58) Field of Classification Search
CPC ........... H04N 21/44008; H04N 21/854; H04N 5/2621; H04N 21/85; H04N 21/44; Y02D 10/00
USPC ......................................................... 386/285
See application file for complete search history.

(56) References Cited

U.S. PATENT DOCUMENTS

| | | | |
|---|---|---|---|
| 2011/0243453 | A1 | 10/2011 | Kashima et al. |
| 2012/0291078 | A1 | 11/2012 | Weerasinghe |
| 2014/0195330 | A1* | 7/2014 | Lee .................. G06Q 30/0242 705/14.41 |
| 2015/0032843 | A1 | 1/2015 | Vaideeswaran et al. |

FOREIGN PATENT DOCUMENTS

| | | |
|---|---|---|
| CN | 110139159 A | 8/2019 |
| CN | 110602546 A | 12/2019 |
| JP | 4649266 B2 | 3/2011 |
| JP | 2011170690 A | 9/2011 |

OTHER PUBLICATIONS

English Translation of Chinese Publication CN110536177 (Year: 2019).*
18087722_Sep. 21, 2023_WO_2013136637_A1_M (Year: 2013).*
China National Intellectual Property Administration, the First Office action issued in Chinese Application No. 202010582609.X, dated Apr. 22, 2022, 12 pages. (Submitted with English Summary of Notice).
China National Intellectual Property Administration, the Second Office action issued in Chinese Application No. 202010582609.X, dated Nov. 16, 2022, 8 pages. (Submitted with English Summary of Notice).
ISA China National Intellectual Property Administration, International Search Report and Written Opinion issued in Application No. PCT/CN2021/101896, dated Sep. 27, 2021, WIPO, 9 pages.
Intellectual Property India, Office Action Issued in Application No. 202227075631, dated Apr. 25, 2023, 8 pages.
Japan Patent Office, Office Action Issued in Application No. 2022579697, Nov. 7, 2023, 4 pages.
European Patent Office, Extended European Search Report Issued in Application No. 21829941.0, Oct. 9, 2023, Germany, 8 pages.

* cited by examiner

VIDEO PROCESSING METHOD AND APPARATUS, DEVICE AND COMPUTER READABLE STORAGE MEDIUM

CROSS-REFERENCE TO RELATED APPLICATIONS

The present application is a continuation of International Application No. PCT/CN2021/101896, filed on Jun. 23, 2021, which claims priority to Chinese Patent Application No. 202010582609.X, filed to the China National Intellectual Property Administration on Jun. 23, 2020, and entitled "VIDEO PROCESSING METHOD AND APPARATUS, DEVICE, AND COMPUTER READABLE STORAGE MEDIUM". Both of the aforementioned patent applications are hereby incorporated by reference in their entireties.

TECHNICAL FIELD

The present disclosure relates to the field of artificial intelligence, in particular to a video processing method and apparatus, a device, a computer readable storage medium, a computer program product, and a computer program.

BACKGROUND

With the development of science and technology, more and more application software have entered the life of users, and gradually enriched the user's spare time life, such as a short video application APP (Application). Users can record their life by the manner of videos, etc., and upload the videos to the short video APP.

Existing methods for making a short video generally require a user to find an appropriate video or photo in an album, and select an appropriate editing pattern from a large number of editing patterns. According to the editing pattern, the video or photo can be edited manually.

However, above methods for making a short video often require a high professional level of a user, and it is difficult for an ordinary user to make a short video having a professional level. Furthermore, the operations of the above methods for making a short video are complicated, resulting in poor user experience.

SUMMARY

The present provides a video processing method and apparatus, a device, a computer readable storage medium, a computer program product, and a computer program, used to solve the technical problem of high processing difficulty and complicated operations of an existing video processing method.

In a first aspect of the present disclosure, a video processing method is provided, including:
  acquiring an image to be processed;
  determining, according to the image to be processed, a target image and a target editing pattern, where the target editing pattern includes at least one of a special effect acting on an audio corresponding to the target image, a special effect acting on an editing point between adjacent images, a special effect acting on a single image, and a special effect acting on an entire editing image; and
  performing, according to the target editing pattern, an editing operation on the target image, to obtain a target video.

In a second aspect of the present disclosure, a video processing apparatus is provided, including:
  an acquisition module, configured to acquire an image to be processed;
  a determination module, configured to determine, according to the image to be processed, a target image and a target editing pattern, where the target editing pattern includes at least one of a special effect acting on an audio corresponding to the target image, a special effect acting on an editing point between adjacent images, a special effect acting on a single image, and a special effect acting on an entire editing image; and
  an edition module, configured to perform, according to the target editing pattern, an editing operation on the target image, to obtain a target video.

In a third aspect of the present disclosure, a server is provided, including: a memory and a processor;
  where the memory is configured to store instructions executable by the processor; and
  the processor is configured to implement, when executing the instructions, the video processing method as described in the first aspect.

In a fourth aspect of the present disclosure, a computer readable storage medium is provided, where the computer readable storage medium has computer executable instructions stored therein, and the computer executable instructions are configured to implement the video processing method as described in the first aspect when being executed by a processor.

In a fifth aspect of the present disclosure, a computer program product is provided, where the computer program product includes a computer program, and the computer program is configured to implement the video processing method as described in the first aspect when being executed by a processor.

In a sixth aspect of the present disclosure, a computer program is provided, where the computer program is configured to implement the video processing method as described in the first aspect when being executed by a processor.

According to the video processing method and apparatus, the device, the computer readable storage medium, the computer program product, and the computer program provided by the present disclosure, by acquiring the image to be processed, and determining, according to the image to be processed, a target image and a target editing pattern, an editing operation on the target image can be performed automatically according to the target editing pattern, to obtain a target video. The target editing pattern includes at least one of a special effect acting on an audio corresponding to the target image, a special effect acting on an editing point between adjacent images, a special effect acting on a single image, and a special effect acting on an entire editing image. It does not require a user to edit manually, and simplifies operation steps of video processing, and improves user experience. In addition, the target video generated by performing an editing operation on the target image through the target editing pattern has high video quality, which can reduce the professional requirements for a user.

BRIEF DESCRIPTION OF DRAWINGS

In order to explain embodiments of the present disclosure or the technical solutions in the prior art more clearly, the drawings that need to be used in the description of the embodiments or the prior art will be briefly introduced in the following. Obviously, the drawings in the following description are some embodiments of the present disclosure, and for those of ordinary skilled in the art, other drawings can be obtained according to these drawings.

DESCRIPTION OF EMBODIMENTS

In order to make the objections, technical solutions and advantages of embodiments of the present disclosure clearer, the technical solutions in the embodiments of the present disclosure will be described clearly and comprehensively with reference to the drawings in the embodiments of the present disclosure. Obviously, the described embodiments are part of the embodiments of the present disclosure, rather than all of them. All other embodiments obtained based on the embodiments in the present disclosure belong to the protection scope of the present disclosure.

Regarding the technical problem of high processing difficulty and complicated operations of an existing video processing method, the present disclosure provides a video processing method and apparatus, a device, a computer readable storage medium, a computer program product, and a computer program.

It should be noted that, the video processing method and apparatus, the device, the computer readable storage medium, the computer program product, and the computer program provided by the present application can be used in any kind of video editing scenarios.

For an existing short video application, when a user wants to publish a video, the user first needs to select an appropriate video or photo in an album, and perform an editing operation manually, add a transition, a special effect, a filter and other content, the operations are usually complicated. And, the above methods have high professional requirements on the video editing for a user, those who do not know how to edit a video cannot make a video having a good effect.

In the process of solving the above technical problem, the inventor found, through research, that in order to improve the efficiency and effect of video editing and reduce manual operations of a user, an image to be processed can be automatically acquired, a target image and a target editing pattern can be automatically determined according to the image to be processed, and automatic edition of a video can be realized.

The inventor further studied and found that, by acquiring an image to be processed, determining, according to the image to be processed, the target image and the target editing pattern, an editing operation on the target image can be performed automatically according to the target editing pattern, to obtain a target video. The target editing pattern includes at least one of a special effect acting on an audio corresponding to the target image, a special effect acting on an editing point between adjacent images, a special effect acting on a single image, and a special effect acting on an entire editing image. It does not require a user to edit manually, so as to simplify operation steps of video processing, and improve user experience. In addition, the target video generated by performing an editing operation on the target image through the target editing pattern has high video quality, which can reduce the professional requirements for a user.

Figure 1:
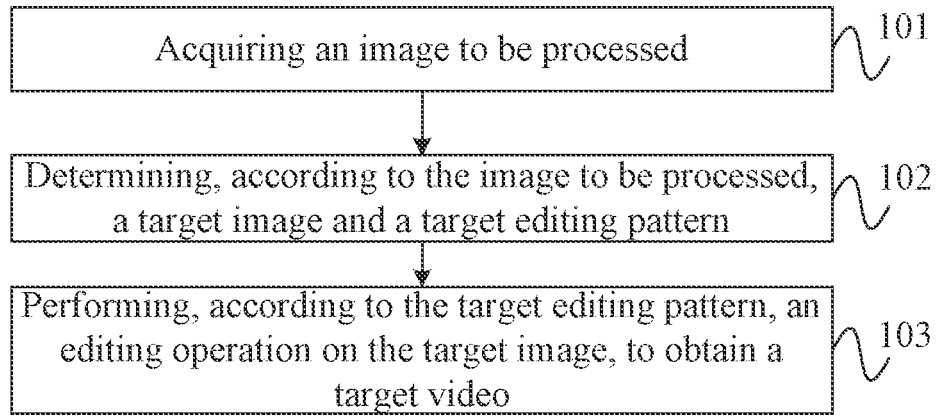
FIG. 1 is a flowchart of a video processing method provided by a first embodiment of the present disclosure.

FIG. 1 is a flowchart of a video processing method provided by a first embodiment of the present disclosure, as shown in FIG. 1, the method includes the following steps.

Step 101, acquiring an image to be processed.

The execution body of this embodiment can be a video processing apparatus, where the apparatus for video processing can be couple in a server or a terminal device.

Figure 2:
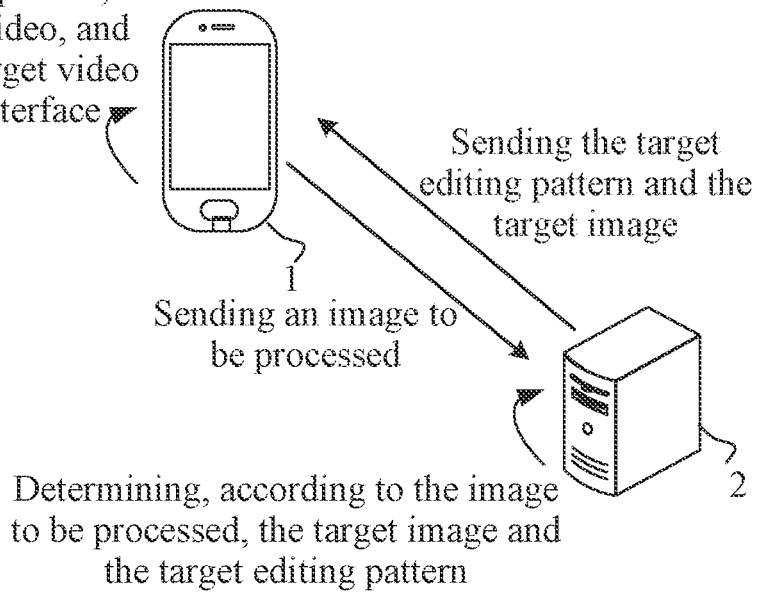
FIG. 2 is a system architecture diagram on which the present disclosure is based when a video processing apparatus is coupled in a server.

FIG. 2 is a system architecture diagram on which the present disclosure is based when a video processing apparatus is coupled in a server, as shown in FIG. 2, the system architecture on which the present disclosure is based at least includes: a terminal device 1 and a server 2, where the server 2 has the video processing apparatus arranged therein. The corresponding software, programs and instructions, etc. in the video processing apparatus are written in C/C++, Java, Shell or Python and other language; the terminal device 1 may be a device such as a desktop computer, a tablet computer, etc. The terminal device 1 is communicatively connected with the server 2, so that it can exchange information with the server 2.

In this implementation, in order to improve the efficiency and effect of video editing and reduce manual operations of a user, the video processing apparatus can acquire an image to be processed, where the image to be processed can specifically include a video or a picture. When the video processing apparatus is coupled in the server, the image to be processed can be acquired from the terminal device by the video processing apparatus. When the video processing apparatus is coupled in the terminal device, the image to be processed can be acquired from a preset storage path by the video processing apparatus.

The image to be processed is obtained after automatically scanning image data stored in an album of a terminal device and performing an aggregation operation on the image data according to content category information of the image data. Specifically, in order to acquire the image information of the terminal device of a user, the image data stored in the album can be automatically scanned according to a preset time interval to acquire the image to be processed. The preset time interval can be a default time interval set by the system, or can be set by the user according to actual needs, for example, it can be three days, one week, etc.

Step 102, determining, according to the image to be processed, a target image and a target editing pattern, where the target editing pattern includes at least one of a special effect acting on an audio corresponding to the target image, a special effect acting on an editing point between adjacent images, a special effect acting on a single image, and a special effect acting on an entire editing image.

In this implementation, after acquiring the image to be processed, the video processing apparatus can determine the target image and the target editing pattern according to the image to be processed, the target editing pattern is specifically used to perform an editing operation on the target image. The editing pattern can include an editing template.

The target editing pattern includes any one or more of a special effect acting on an audio corresponding to the target image, a special effect acting on an editing point between adjacent images, a special effect acting on a single image, and a special effect acting on an entire editing image.

Since the target editing pattern includes one or more above special effects, the effect of the target video obtained according to the target editing pattern is better.

Step 103, performing, according to the target editing pattern, an editing operation on the target image, to obtain a target video.

In this implementation, after obtaining the target image and the target editing pattern, the video processing apparatus can automatically perform the editing operation on the target image according to the target editing pattern, to obtain the target video, thereby a target video having a good effect can be automatically generated without requiring the user to edit manually, and the user experience is improved.

Optionally, when the video processing apparatus coupled in the server, the video processing apparatus can send the target image together with the target editing pattern to the terminal device. Thus, after obtaining the target editing pattern and the target image, the terminal device can automatically perform an editing operation on the target image according to the target editing pattern, to generate the target video.

Optionally, when the video processing apparatus coupled in the server, the video processing apparatus automatically performs an editing operation on the target image according to the target editing pattern, to obtain the target video, and sends the target video to the terminal device to be displayed.

In an actual application, the target video corresponds to a different video category, such as a scenery category, a people category, etc. Therefore, when displaying the target video on the terminal device, in order to improve a user's viewing efficiency of the target video, a video category corresponding to a respective target video can be respectively determined. And the target video is classified and displayed according to the video category.

The video processing method of the present application can be implemented as including following steps: acquiring an image to be processed sent by a terminal device; performing a classification operation on a respective image to be processed, and setting a content category label for the respective image to be processed according to category information; performing an aggregation operation on the content category label corresponding to the respective image to be processed, to obtain an aggregated image to be processed; performing a matching operation on content category labels corresponding to the image to be processed and multiple preset editing patterns, to obtain a target editing pattern corresponding to the image to be processed; and sending the target image and the target editing pattern to the terminal device.

Figure 3:
FIG. 3 is a schematic diagram of a display interface provided by an embodiment of the present disclosure.

FIG. 3 is a schematic diagram of a display interface provided by an embodiment of the present disclosure, as shown in FIG. 3, the video category can include a beat matching type, a travel type, a cinematic type, etc. In addition, a target video having high quality can also be filtered within a preset time threshold value, and be prior displayed on a home page as a recommended category.

After displaying the respective target video on the display interface, the user can select an appropriate target video to edit or publish. Specifically, in response to a triggering operation of the user on the target video, an editing interface corresponding to the target video can be displayed on the display interface according to the triggering operation.

Specifically, the user can realize the inputting of an editing instruction by triggering a preset icon on the editing interface. Then the terminal device can perform the editing operation on the target video according to the editing instruction, to obtain the edited target video. The edited target video can better meet a personalized need of the user.

Accordingly, after performing the editing operation on the target video to obtain the edited target video, the edited target video can be published to a platform. In addition, in the process of publishing a video, the user can set a different viewing permission for the edited target video, for example, the viewing permission includes: visible for all, visible for a specified user, only visible for himself or herself, invisible for a specified user, etc.

As an implementable way, after obtaining the edited target video, the edited target video may not be published, but stored into a preset storage path, or may be shared to other users for viewing, which will not be limited by the present disclosure.

Figure 4:
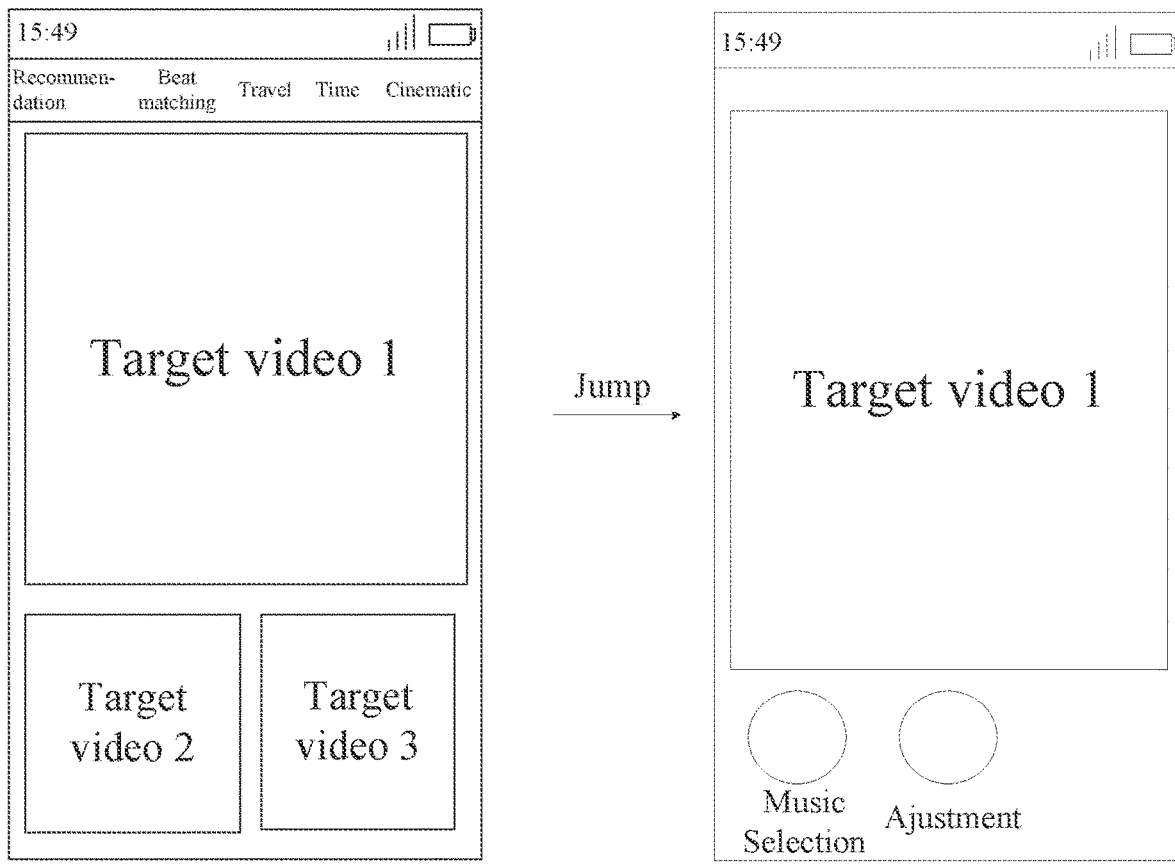
FIG. 4 is a schematic diagram of a display interface provided by another embodiment of the present disclosure.

FIG. 4 is a schematic diagram of a display interface provided by another embodiment of the present disclosure, as shown in FIG. 4, an editing interface is provided with icons for music selection and adjustment, a user can realize to generate an editing instruction by triggering the icons. After obtaining the editing instruction, the editing interface can jumped to a page for editing details, the user can perform a corresponding editing operation according to a corresponding indication on the display interface on the page for editing details.

It should be noted that, since a corresponding target editing pattern is different, there is a different editing type for a different target video. The editing type includes any one of editable, partially editable, and non-editable. For example, if the target video may be a beat matching video which is made on the user's birthday, where the background music can be "happy birthday (Chinese)", "happy birthday" and other voices, and accordingly, the text information in its editing pattern may be birthday related text. At this time, because the background music and the text information are highly matched, neither the text information nor the background music in the target video may be edited independently, but the user can adjust a sequence of a video paragraph or a picture in the target video by himself or herself.

According to the video processing method provided by this embodiment, by acquiring the image to be processed, and determining, according to the image to be processed, a target image and a target editing pattern, an editing operation on the target image can be performed automatically according to the target editing pattern, to obtain a target video. The target editing pattern includes at least one of a special effect acting on an audio corresponding to the target image, a special effect acting on an editing point between adjacent images, a special effect acting on a single image, and a special effect acting on an entire editing image. It does not require a user to edit manually, and simplifies operation steps of video processing, and improves user experience. In addition, the target video generated by performing an editing operation on the target image through the target editing pattern has high video quality, which can reduce the professional requirements for a user.

Figure 5:
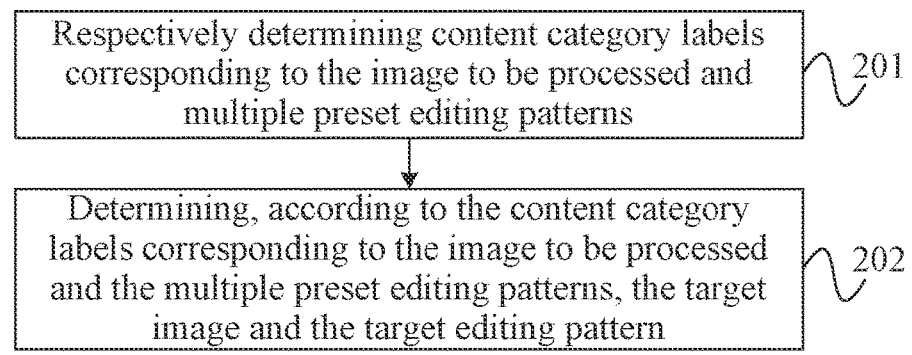
FIG. 5 is a flowchart of a video processing method provided by a second embodiment of the present disclosure.

FIG. 5 is a flowchart of a video processing method provided by a second embodiment of the present disclosure, on the basis of the first embodiment, as shown in FIG. 5, step 102 specifically includes:

step 201, respectively determining content category labels corresponding to the image to be processed and multiple preset editing patterns; and step 202, determining, according to the content category labels corresponding to the image to be processed and the multiple preset editing patterns, the target image and the target editing pattern.

In this embodiment, the image to be processed and the multiple preset editing patterns respectively correspond to content category labels, the content category labels includes, but not limit to, scenery, people, food, travel, pet, etc. For an image to be processed with a different content category, an editing pattern with a relevant content category is used respectively to perform a video edition, the effect of the obtained target video is better.

Therefore, after acquiring the image to be processed, the content category labels corresponding to the image to be processed and the multiple preset editing patterns can be respectively determined. The target image and the target editing pattern are determined according to the content category labels.

Since the target editing pattern is obtained after performing a matching operation according to the content category corresponding to the image to be processed, a matching degree between the target editing pattern and the image to be processed is high. The effect of the video generated after being edited by the target editing pattern is better. In addition, since the target editing pattern includes any one or more of a special effect acting on an audio corresponding to the target image, a special effect acting on an editing point between adjacent images, a special effect acting on a single image, and a special effect acting on an entire editing image. It does not require a user to manually select the above information in sequence, thereby an efficiency of generating a video is improved, user experience is improved, and the requirement for a user's professional level is not high.

Specifically, on the basis of the first embodiment, step 202 specifically includes:

determining, with use of a preset label matching algorithm, a target editing pattern for which a matching degree of a content category label among the content category labels corresponding to the multiple preset editing patterns with a content category label corresponding to the image to be processed exceeds a preset threshold value;

performing, according to the target editing pattern, a filtering operation on the image to be processed, to obtain the target image corresponding to the target editing pattern.

In this embodiment, in order to improve the quality of the generated target video, after obtaining the target editing pattern according to the matching of the image to be processed, filtering and optimizing operations can continue to be performed on the image to be processed according to the target editing pattern, to further improve the matching degree between the image to be processed and the target editing pattern.

Specifically, the target editing pattern for which a matching degree of a content category label among the content category labels corresponding to the multiple preset editing patterns with a content category label corresponding to the image to be processed exceeds a preset threshold value can be determined with use of a preset label matching algorithm. For example, similarity degrees between the content category labels corresponding to the respective editing patterns and the content category label corresponding to the image to be processed can be respectively calculated by the preset label matching algorithm, and an editing pattern whose similarity degree exceeds the preset threshold value is taken as the target editing pattern.

Due to the number of images to be processed is large, after obtaining the target editing pattern, the filtering operation on the images to be processed can be further performed according to the target editing pattern to obtain the target image corresponding to the target editing pattern.

Figure 6:
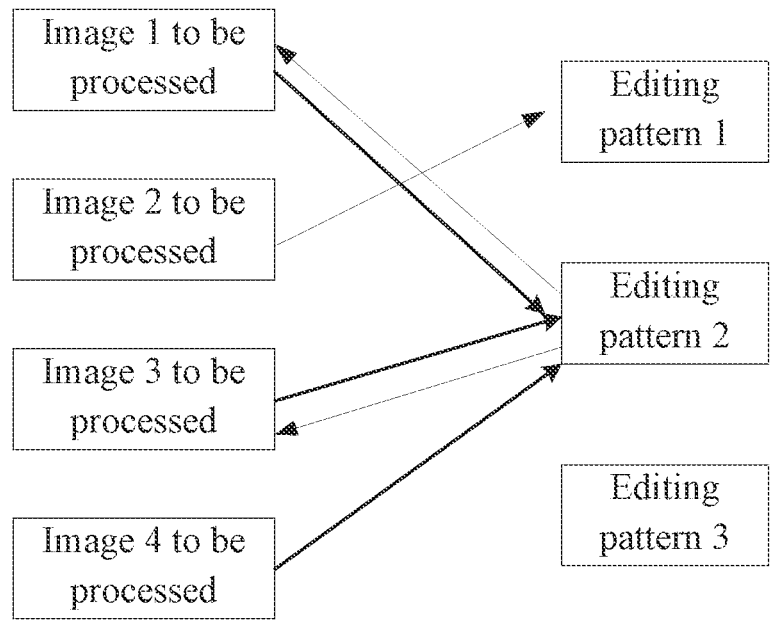
FIG. 6 is a schematic diagram of matching of a target editing pattern provided by embodiments of the present disclosure.

FIG. 6 is a schematic diagram of matching of a target editing pattern provided by embodiments of the present disclosure, as shown in FIG. 6, the number of the images to be processed is 4, a preset label matching algorithm is used to match a corresponding target editing pattern for the images to be processed. Then, the images to be processed are inversely filtered according to the target editing pattern, finally two target images corresponding to the target editing pattern are obtained. The matching degree between the target image and the target editing pattern is further increased, and the quality of the generated target video is improved.

According to the video processing method provided by the present embodiment, by continuing to perform filtering and optimizing operations on the image to be processed according to the target editing pattern after obtaining the target editing pattern according to the matching of the image to be processed, the matching degree between the target image and the target editing pattern can be further increased, and the quality of the generated target video is improved.

In order to implement a determination operation on the target editing pattern and the target image, on the one hand, the matching method in serial of the above described embodiment can be used, on the other hand, a matching method in parallel can also be used.

Specifically, on the basis of the first embodiment, the step 202 specifically includes:

determining, according to the content category labels corresponding to the multiple preset editing patterns, a group of editing patterns for each of which a matching degree of a content category label with the content category label corresponding to the image to be processed exceeds a preset threshold value, with use of a preset label matching algorithm, to obtain a first matching group, wherein the first matching group comprises the image to be processed and the group of editing patterns;

determining, according to the content category label corresponding to the image to be processed, a group of images to be processed for which a matching degree of a content category label with the content category labels corresponding to the multiple preset editing patterns exceeds a preset threshold value, to obtain a second matching group, wherein the second matching group comprises the group of images to be processed and the multiple preset editing patterns; and determining, according to the first matching group and the second matching group, the target image and the target editing pattern.

In this embodiment, with use of a preset label matching algorithm, the group of editing patterns for each of which a matching degree of a content category label among the content category labels corresponding to the multiple preset editing patterns with the content category label corresponding to the image to be processed exceeds a preset threshold value can be determined, to obtain the first matching group, where the first matching group includes the image to be processed and the group of editing patterns. For example, similarity degrees between the content category labels corresponding to the respective editing patterns and the content category label corresponding to the image to be processed can be respectively calculated by the preset label matching algorithm, and editing patterns whose similarity degrees exceed the preset threshold value are taken as the group of editing patterns.

At the same time, with use of a preset label matching algorithm, a group of images to be processed whose matching degree with the multiple preset editing patterns exceeds a preset threshold value can be determined among multiple images to be processed, so as to obtain a second matching group, where the second matching group includes the group of image to be processed and the multiple preset editing patterns. It should be noted that, the number of editing patterns in the multiple preset editing patterns is larger than the number of editing patterns in the group of editing pattern.

After obtaining the first matching group and the second matching group, the target editing pattern and the target image can be determined according to the first matching group and the second matching group.

Further, on the basis of any one of above embodiments, the determining, according to the first matching group and the second matching group, the target image and the target editing pattern includes:

calculating an intersection group between the first matching group and the second matching group, and taking an image to be processed and an editing pattern in the intersection group as the target image and the target editing pattern.

In this embodiment, an intersection of the first matching group and the second matching group can be obtained. In this intersection, the matching degrees of the group of images to be processed and the group of editing patterns are high, so that an image to be processed and an editing pattern in the intersection group can be taken as the target image and the target editing pattern.

Further, on the basis of any one of the above embodiments, after the calculating an intersection group between the first matching group and the second matching group, the method further includes:

if a number of images to be processed in the intersection group is less than a preset threshold of a number of images to be processed, after determining the group of editing patterns for each of which a matching degree of a content category label with the content category label corresponding to the image to be processed exceeds a preset threshold value among the multiple preset editing patterns, performing, according to the group of editing patterns, a filtering operation on the image to be processed, to obtain the target image corresponding to the group of editing patterns, and taking the group of editing patterns as the target editing pattern.

In this embodiment, when the number of the images to be processed in the intersection group between the first matching group and the second matching group is less, the quality of a video made according to the intersection group is also accordingly poor. Hence, at this time, a matching manner in serial can be used to determine the editing pattern and the image to be processed. Specifically, after determining the group of editing patterns for each of which a matching degree of a content category label with the content category label corresponding to a preset image to be processed exceeds a preset threshold value among the content category labels corresponding to the multiple preset editing patterns, a filtering operation on the image to be processed can be performed according to the group of editing patterns, to obtain the target image corresponding to the group of editing patterns.

Accordingly, the video processing apparatus can send the target editing pattern together with the target image to the terminal device, so as to make the terminal device perform an editing operation on the target image according to the target editing pattern.

According to the video processing method provided by this embodiment, by determining the group of editing patterns and its corresponding target image by using a matching manner in parallel, the matching degree between the image to be processed and the group of editing patterns can be further increased, and the quality of the made target video is improved.

Figure 7:
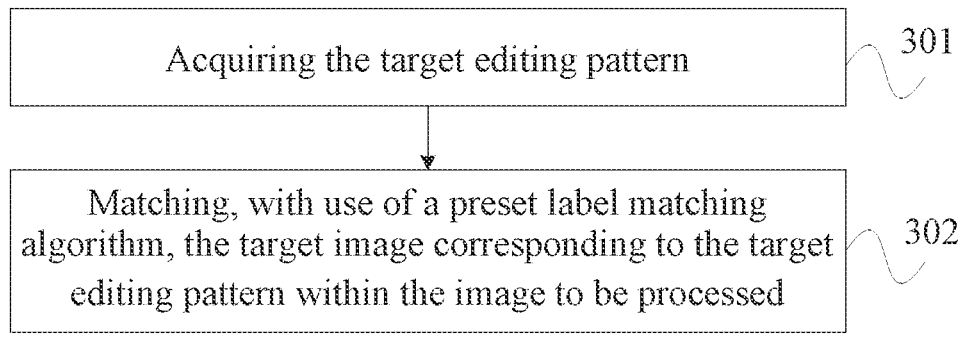
FIG. 7 is a flowchart of a video processing method provided by a third embodiment of the present disclosure.

FIG. 7 is a flowchart of a video processing method provided by a third embodiment of the present disclosure, on the basis of any one of the above embodiments, as shown in FIG. 7, step 102 specifically includes:

step 301, acquiring the target editing pattern, where the target editing pattern is determined according to a template selecting operation triggered by a user;

step 302, matching, with use of a preset label matching algorithm, the target image corresponding to the target editing pattern within the image to be processed.

In this embodiment, the video processing apparatus can also perform a determination of the target editing pattern according to a personalized need of the user. Specifically, the target editing pattern can be acquired, where the target editing pattern is determined by a user triggering the template selecting operation according to the actual needs.

After acquiring the target editing pattern, the preset label matching algorithm can be used to match a target image to correspond to the target editing pattern within the images to be processed corresponding to the terminal device.

After obtaining the target image and the target editing pattern, the video processing apparatus can automatically perform the editing operation on the target image according to the target editing pattern, to obtain the target video. Without requiring the user to edit manually, it can automatically generate a target video having a better effect, and improve the user experience.

According to the video processing method provided by this embodiment, by automatically matching its corresponding target image according to the target editing pattern selected by a user, the terminal device can generate a corresponding target video automatically according to the target image, does not require many manual operations of a user, the generation efficiency of the target video and the quality of the generated target video are improved, and the user experience is improved.

Figure 8:
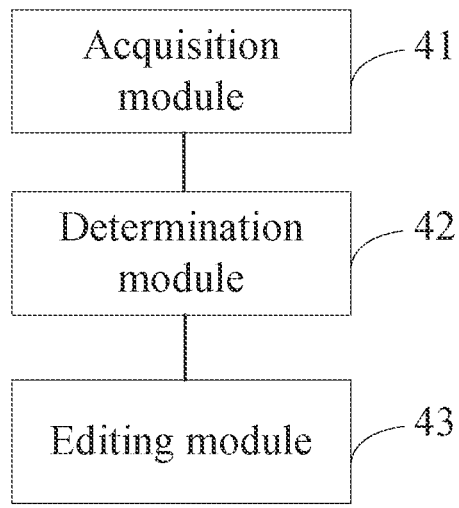
FIG. 8 is a schematic structural diagram of a video processing apparatus provided by a fourth embodiment of the present disclosure.

FIG. 8 is a schematic structural diagram of a video processing apparatus provided by a fourth embodiment of the present disclosure, as shown in FIG. 8, the video processing apparatus includes: an acquisition module 41, a determination module 42, and an edition module 43, where the acquisition module 41 is configured to acquire an image to be processed; the determination module 42 is configured to determine, according to the image to be processed, a target image and a target editing pattern, where the target editing pattern includes at least one of a special effect acting on an audio corresponding to the target image, a special effect acting on an editing point between adjacent images, a special effect acting on a single image, and a special effect acting on an entire editing image; and the edition module 43 is configured to perform, according to the target editing pattern, an editing operation on the target image, to obtain a target video.

According to the video processing apparatus provided by this embodiment, by acquiring the image to be processed, and determining, according to the image to be processed, a target image and a target editing pattern, an editing operation on the target image can be performed automatically according to the target editing pattern, to obtain a target video. The target editing pattern includes at least one of a special effect acting on an audio corresponding to the target image, a special effect acting on an editing point between adjacent images, a special effect acting on a single image, and a special effect acting on an entire editing image. It does not require a user to edit manually, and simplifies operation steps of video processing, and improves user experience. In addition, the target video generated by performing an editing operation on the target image through the target editing pattern has high video quality, which can reduce the professional requirements for a user.

Figure 9:
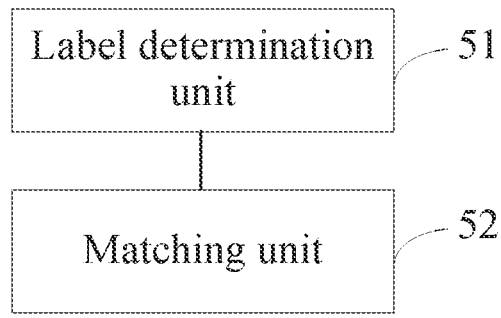
FIG. 9 is a schematic structural diagram of a video processing apparatus provided by a fifth embodiment of the present disclosure.

FIG. 9 is a schematic structural diagram of a video processing apparatus provided by a fifth embodiment of the present disclosure, on the basis of the fourth embodiment, the determination module specifically includes: a label determination unit 51 and a matching unit 52. where the label determination unit 51 is configured to respectively determine content category labels corresponding to the image to be processed and multiple preset editing patterns; the matching unit 52 is configured to determine, according to the content category labels corresponding to the image to be processed and the multiple preset editing patterns, the target image and the target editing pattern.

Further, on the basis of any one of the above embodiments, the matching unit is configured to:
  determine, with use of a preset label matching algorithm, a target editing pattern for which a matching degree of a content category label among the content category labels corresponding to the multiple preset editing patterns with a content category label corresponding to the image to be processed exceeds a preset threshold value; and
  perform, according to the target editing pattern, a filtering operation on the image to be processed, to obtain the target image corresponding to the target editing pattern.

Further, on the basis of any one of the above embodiments, the matching unit is configured to:
  determine, according to the content category labels corresponding to the multiple preset editing patterns, a group of editing patterns for each of which a matching degree of a content category label with the content category label corresponding to the image to be processed exceeds a preset threshold value, with use of a preset label matching algorithm, to obtain a first matching group, wherein the first matching group comprises the image to be processed and the group of editing patterns;
  determine, according to the content category label corresponding to the image to be processed, a group of images to be processed for which a matching degree of a content category label with the content category labels corresponding to the multiple preset editing patterns exceeds a preset threshold value, to obtain a second matching group, wherein the second matching group comprises the group of images to be processed and the multiple preset editing patterns; and
  determine, according to the first matching group and the second matching group, the target image and the target editing pattern.

Further, on the basis of any one of the above embodiments, the matching unit is configured to:
  calculate an intersection group between the first matching group and the second matching group, and take an image to be processed and an editing pattern in the intersection group as the target image and the target editing pattern.

Further, on the basis of any one of the above embodiments, the matching unit is configured to:
  if a number of images to be processed in the intersection group is less than a preset threshold of a number of images to be processed, after determining the group of editing patterns for each of which a matching degree of a content category label with the content category label corresponding to the image to be processed exceeds a preset threshold value among the multiple preset editing patterns, perform, according to the group of editing patterns, a filtering operation on the image to be processed, to obtain the target image corresponding to the group of editing patterns, and take the group of editing patterns as the target editing pattern.

Figure 10:
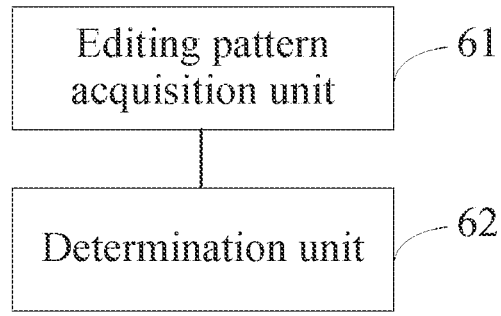
FIG. 10 is a schematic structural diagram of a video processing apparatus provided by a sixth embodiment of the present disclosure.

FIG. 10 is a schematic structural diagram of a video processing apparatus provided by a sixth embodiment of the present disclosure, on the basis of any one of the above embodiments, as shown in FIG. 10, the determination module includes: an editing pattern acquisition unit 61 and a determination unit 62. The editing pattern acquisition unit 61 is configured to acquire the target editing pattern, where the target editing pattern is determined according to a template selecting operation triggered by a user; the determination unit 62 is configured to match, with use of a preset label matching algorithm, the target image corresponding to the target editing pattern within the image to be processed.

Figure 11:
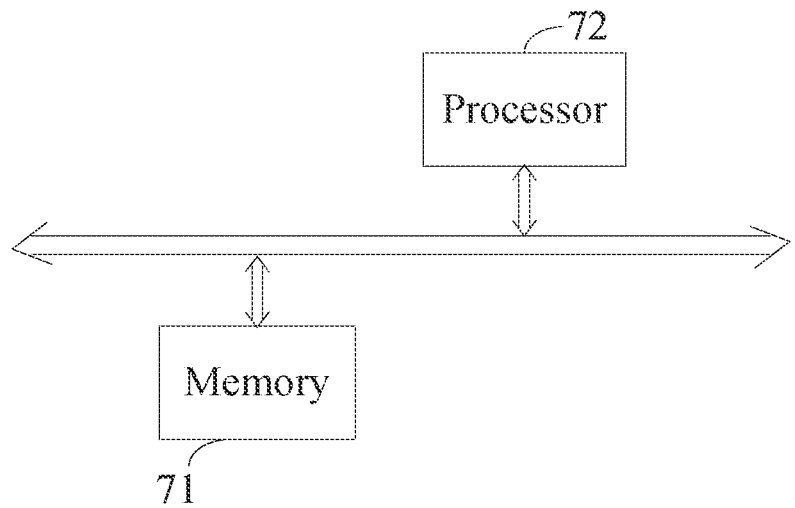
FIG. 11 is a schematic structural diagram of a server provided by a seventh embodiment of the present disclosure.

FIG. 11 is a schematic structural diagram of a server provided by a seventh embodiment of the present disclosure, as shown in FIG. 11, the server includes: a memory 71, and a processor 72;
  where the memory 71 is configured to store instructions executable by the processor 72; and
  the processor 72 is configured to implement, when executing the instructions, the video processing method as described in any one of the above embodiments.

The memory 71 is configured to store a program. Specifically, the program may include program codes, where the program codes includes computer operation instructions. The memory 71 may include a high speed RAM (Random Access Memory), may also include non-volatile memory (non-volatile memory), such as at least one disk memory.

The processor 72 may be a central processing unit (Central Processing Unit, CPU for short), or an application specific integrated circuit (Application Specific Integrated Circuit, ASIC for short), or is configured to be one or more integrated circuits of the embodiments of the present disclosure.

Optionally, in terms of specific implementation, if the memory 71 and the processor 72 are implemented independently, the memory 71 and the processor 72 can be connected to each other through a bus and complete the communication with each other. The bus can be an industry standard architecture (Industry Standard Architecture, ISA for short) bus, a peripheral component (Peripheral Component, PCI for short) bus or an extended industry standard architecture (Extended Industry Standard Architecture, EISA for short) bus. The bus can be divided into an address bus, a data bus, a control bus, etc. For convenience of representation, FIG. 11 only uses a thick line to represent it, but it does not mean that there is only one bus or one type of bus.

Optionally, in terms of specific implementation, if the memory 71 and the processor 72 are integrated on one chip for implementation, the memory 71 and the processor 72 can communicate with each other through an internal interface.

Another embodiment of the present disclosure further provides a computer readable storage medium, where the computer readable storage medium has computer executable instructions stored therein, and the computer executable instructions are configured to implement the video processing method as described in any one of the above embodiments when being executed by a processor.

Another embodiment of the present disclosure further provides a computer program product, where the computer program product includes a computer program, and the computer program is configured to implement the video processing method as described in any one of the above embodiments when being executed by a processor.

Another embodiment of the present disclosure further provides a computer program is provided, where the computer program is configured to implement the video processing method as described in any one of the above embodiments when being executed by a processor.

Those skilled belonging to the art can clearly understand that, for convenience and simplicity of description, the specific working process of the apparatus described above can refer to the corresponding process in aforementioned method embodiments, and will not be repeated here.

It can be understood by those ordinary skilled in the art that all or part of the steps to implement the above method embodiments can be completed through hardware related to program instructions. The aforementioned program can be stored in a computer readable storage medium. When the program is executed, the steps included in the above respective method embodiments are executed; and the aforementioned storage medium includes: a ROM, a RAM, a magnetic disc or an optical disc and other mediums that can store program codes.

Finally, it should be noted that the above respective embodiments are only used to illustrate the technical solution of the present disclosure, not to limit it; although the present disclosure has been described in detail with reference to the aforementioned respective embodiments, those ordinary skilled in the art should understand that: they can still modify the technical solutions recorded in the aforementioned respective embodiments, or equivalently replace some or all of the technical features; and these modifications or substitutions do not make the nature of the corresponding technical solutions departing from the scope of the technical solutions of the respective embodiments of the present disclosure.

What is claimed is:

1. A video processing method, comprising:
acquiring at least two images to be processed;
determining, according to the at least two images to be processed, a target image and a target editing pattern, wherein the target editing pattern comprises at least one of a special effect acting on an audio corresponding to the target image, a special effect acting on an editing point between adjacent images, a special effect acting on a single image, and a special effect acting on an entire editing image; and
performing, according to the target editing pattern, an editing operation on the target image, to obtain a target video;
wherein the determining, according to the at least two images to be processed, the target image and the target editing pattern comprises: respectively determining content category labels corresponding to the at least two images to be processed and multiple preset editing patterns; and determining, according to the content category labels corresponding to the at least two images to be processed and the multiple preset editing patterns, the target image and the target editing pattern;
wherein the determining, according to the content category labels corresponding to the at least two images to be processed and the multiple preset editing patterns, the target image and the target editing pattern comprises: determining, according to the content category labels corresponding to the multiple preset editing patterns, a group of editing patterns for each of which a matching degree of a content category label with a content category label corresponding to one of the at least two images to be processed exceeds a preset threshold value, with use of a preset label matching algorithm, to obtain a first matching group, wherein the first matching group comprises the at least two images to be processed and the group of editing patterns; determining, according to the content category labels corresponding to the at least two images to be processed, a group of images to be processed for each of which a matching degree of a content category label with a content category label corresponding to one of the multiple preset editing patterns exceeds a preset threshold value, to obtain a second matching group, wherein the second matching group comprises the group of images to be processed and the multiple preset editing patterns; and determining, according to the first matching group and the second matching group, the target image and the target editing pattern; and
wherein, the determining, according to the first matching group and the second matching group, the target image and the target editing pattern comprises: calculating an intersection group between the first matching group and the second matching group, and taking an image to be processed and an editing pattern in the intersection group as the target image and the target editing pattern; and after the calculating the intersection group between the first matching group and the second matching group, if a number of images to be processed in the intersection group is less than a preset threshold of a number of images to be processed, after determining the group of editing patterns for each of which a matching degree of a content category label with a content category label corresponding to one of the at least two images to be processed exceeds a preset threshold value among the multiple preset editing patterns, performing, according to the group of editing patterns, a filtering operation on the at least two images to be processed, to obtain the target image corresponding to the group of editing patterns, and taking the group of editing patterns as the target editing pattern.

2. The method according to claim 1, wherein the determining the target image and the target editing pattern comprises:
acquiring the target editing pattern, wherein the target editing pattern is determined according to a template selecting operation triggered by a user; and determining, with use of the preset label matching algorithm, the target image corresponding to the target editing pattern within the at least two images to be processed.

3. The method according to claim 1, wherein the acquiring the at least two images to be processed comprises:
acquiring the at least two images to be processed according to a preset time interval.

4. The method according to claim 1, further comprising:
determining a video category corresponding to the target video; and
classifying and displaying the target video according to the video category.

5. The method according to claim 1, further comprising:
displaying, in response to a triggering operation of a user on the target video, an editing interface corresponding to the target video according to the triggering operation;
receiving an editing instruction from the user; and
performing an editing operation on the target video according to the editing instruction, to obtain an edited target video.

6. A video processing apparatus, coupled in a server or a terminal device, comprising: a memory and a processor;
wherein the memory is configured to store instructions executable by the processor; and
the processor, when executing the instructions, is configured to:
acquire at least two images to be processed;
determine, according to the at least two images to be processed, a target image and a target editing pattern, wherein the target editing pattern comprises at least one of a special effect acting on an audio corresponding to the target image, a special effect acting on an editing point between adjacent images, a special effect acting on a single image, and a special effect acting on an entire editing image; and
perform, according to the target editing pattern, an editing operation on the target image, to obtain a target video;
wherein the processor is further configured to:
respectively determine content category labels corresponding to the at least two images to be processed and multiple preset editing patterns; and determine, according to the content category labels corresponding to the at least two images to be processed and the multiple preset editing patterns, the target image and the target editing pattern;
determine, according to the content category labels corresponding to the multiple preset editing patterns, a group of editing patterns for each of which a matching degree of a content category label with a content category label corresponding to one of the at least two images to be processed exceeds a preset threshold value, with use of a preset label matching algorithm, to obtain a first matching group, wherein the first matching group comprises the at least two images to be processed and the group of editing patterns; determine, according to the content category labels corresponding to the at least two images to be processed, a group of images to be processed for each of which a matching degree of a content category label with a content category label corresponding to one of the multiple preset editing patterns exceeds a preset threshold value, to obtain a second matching group, wherein the second matching group comprises the group of images to be processed and the multiple preset editing patterns; and determine, according to the first matching group and the second matching group, the target image and the target editing pattern; and
calculate an intersection group between the first matching group and the second matching group, and take an image to be processed and an editing pattern in the intersection group as the target image and the target editing pattern; and, if a number of images to be processed in the intersection group is less than a preset threshold of a number of images to be processed, after determining the group of editing patterns for each of which a matching degree of a content category label with a content category label corresponding to one of the at least two images to be processed exceeds a preset threshold value among the multiple preset editing patterns, perform, according to the group of editing patterns, a filtering operation on the at least two images to be processed, to obtain the target image corresponding to the group of editing patterns, and take the group of editing patterns as the target editing pattern.

7. The apparatus according to claim 6, wherein the processor is configured to:
acquire the target editing pattern, wherein the target editing pattern is determined according to a template selecting operation triggered by a user; and
determine, with use of the preset label matching algorithm, the target image corresponding to the target editing pattern within the at least two images to be processed.

8. A non-transitory computer readable storage medium, wherein the computer readable storage medium has computer executable instructions stored therein, and the computer executable instructions, when being executed by a processor, are configured to implement following steps:
acquiring at least two images to be processed;
determining, according to the at least two images to be processed, a target image and a target editing pattern, wherein the target editing pattern comprises at least one of a special effect acting on an audio corresponding to the target image, a special effect acting on an editing point between adjacent images, a special effect acting on a single image, and a special effect acting on an entire editing image; and
performing, according to the target editing pattern, an editing operation on the target image, to obtain a target video;
wherein the computer executable instructions, when being executed by a processor, are further configured to implement following steps:
respectively determining content category labels corresponding to the at least two images to be processed and multiple preset editing patterns; and determining, according to the content category labels corresponding to the at least two images to be processed and the multiple preset editing patterns, the target image and the target editing pattern;
determining, according to the content category labels corresponding to the multiple preset editing patterns, a group of editing patterns for each of which a matching degree of a content category label with a content category label corresponding to one of the at least two images to be processed exceeds a preset threshold value, with use of a preset label matching algorithm, to obtain a first matching group, wherein the first matching group comprises the at least two images to be processed and the group of editing patterns; determining, according to the content category labels corresponding to the at least two images to be processed, a group of images to be processed for each of which a matching degree of a content category label with a content category label corresponding to one of the multiple preset editing patterns exceeds a preset threshold value, to obtain a second matching group, wherein the second matching group comprises the group of images to be processed and the multiple preset editing patterns; and determining, according to the first matching group and the second matching group, the target image and the target editing pattern; and calculating an intersection group between the first matching group and the second matching group, and taking an image to be processed and an editing pattern in the intersection group as the target image and the target editing pattern; and, if a number of images to be processed in the intersection group is less than a preset threshold of a number of images to be processed, after determining the group of editing patterns for each of which a matching degree of a content category label with a content category label corresponding to one of the at least two images to be processed exceeds a preset threshold value among the multiple preset editing patterns, performing, according to the group of editing patterns, a filtering operation on the at least two images to be processed, to obtain the target image corresponding to the group of editing patterns, and taking the group of editing patterns as the target editing pattern.

* * * * *